(No Model.)
J. CLARE.
CULTIVATOR.
No. 408,694. Patented Aug. 13, 1889.
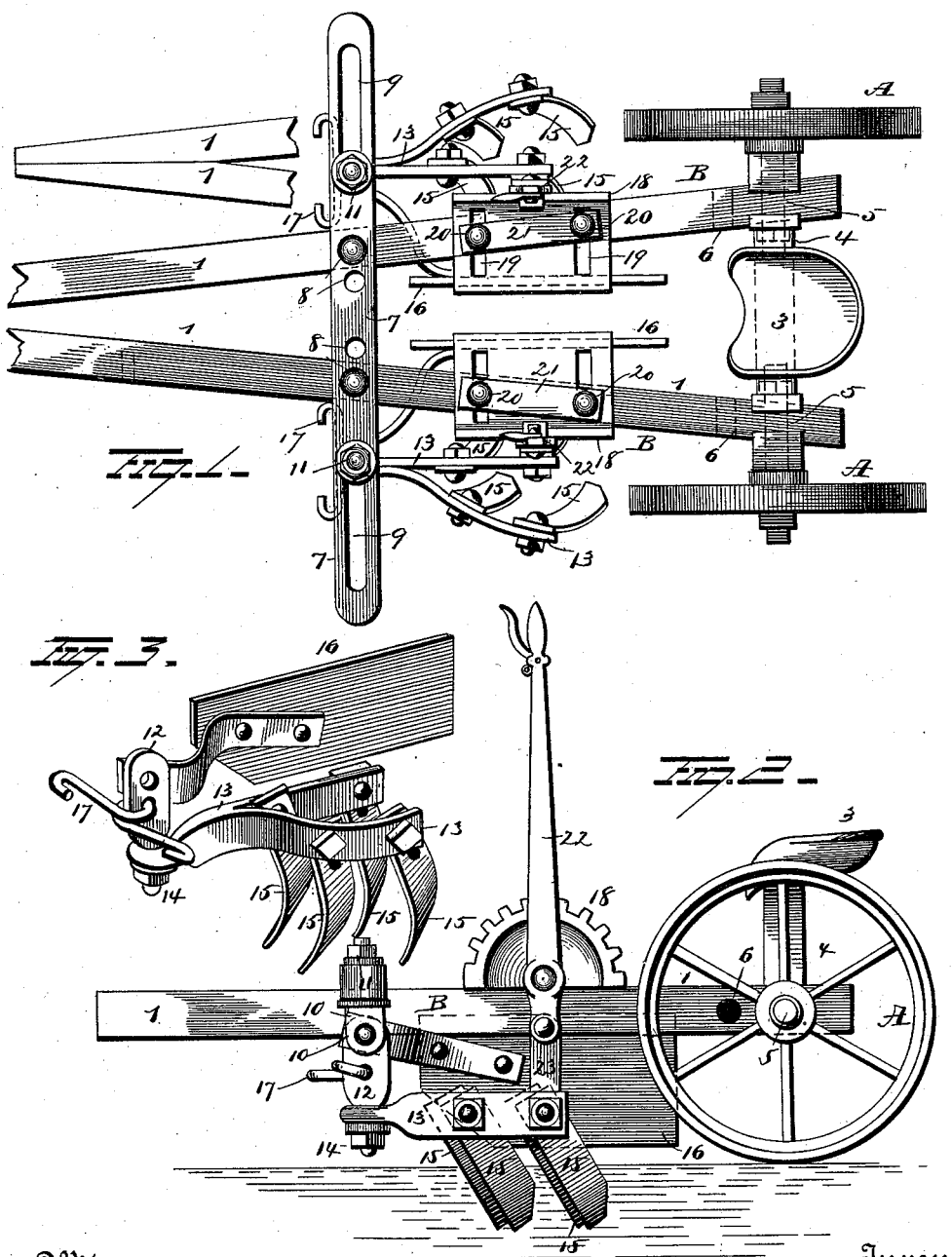
Witnesses
E. J. Nottingham
G. F. Downing
Inventor
John Clare
By his Attorney
H. A. Seymour

UNITED STATES PATENT OFFICE.

JOHN CLARE, OF IMOGENE, IOWA.

CULTIVATOR.

SPECIFICATION forming part of Letters Patent No. 408,694, dated August 13, 1889.

Application filed March 19, 1889. Serial No. 303,825. (No model.)

*To all whom it may concern:*

Be it known that I, JOHN CLARE, of Imogene, in the county of Fremont and State of Iowa, have invented certain new and useful Improvements in Cultivators; and I do hereby declare the following to be a full, clear, and exact description of the invention, such as will enable others skilled in the art to which it appertains to make and use the same.

My invention relates to an improvement in cultivators, and to that class of cultivators more particularly adapted for working listed corn.

The object is to provide a cultivator with mechanism whereby the teeth may be readily raised, lowered, shifted laterally, and otherwise adjusted; and with this end in view my invention consists in certain features of constructions and combinations of parts, as will be hereinafter described, and pointed out in the claims.

In the accompanying drawings, Figure 1 is a plan view of my improved plow. Fig. 2 is a side elevation, and Fig. 3 is a detached view of one of the forked arms and blades.

A A represent the ground-wheels, and B the frame of the cultivator carried by said wheels. The frame preferably consists of a pair of beams 1, coming together at the forward end and farthest apart at the rear end, where the seat 3 is secured. The seat is supported on a U-shaped bow-spring 4, and the latter is conveniently supported on the inner ends of the spindles 5, on which the wheels A A turn. The beams 1 are provided with one or more holes 6 to receive these spindles, so that they may be placed forward or backward, if desired. It will be noticed that as the seat is always held on the wheel-spindles the weight of the driver is over or about over the wheels.

Near the forward end of the beams the cross-bar 7 is secured. The lower face of this bar is recessed to receive the beams, and the bar back of these recesses is provided with bolt or screw holes 8, so that the bar may be moved forward or backward on the beams. It might also be mentioned right in this connection that by the adjustment of this cross-bar the beams could be spread apart slightly or drawn nearer together at the rear end, thus accommodating the cultivator itself more or less to the width of rows.

The cross-bar 7 projects out at the sides for some distance from the beams, and in this instance is furnished at each end with an elongated slot 9, and in each of these slots the knuckles 10 are adjustably secured by nuts or similar devices 11. This, however, it should be understood, is only one of numerous ways of adjustably attaching the knuckle, as it is obvious that it might be clipped or bolted to the bar, if desired. To these knuckles the pendent arms 12 are pivoted, and to the latter the forked arms 13 are removably secured by nuts or other means 14. Said forked arms are so arranged that one extends directly backward and the other curves outward and is preferably a little longer. The teeth or blades 15 are secured to the branches of these forked arms in such a manner that no two follow the same track, thereby more effectually scarifying the soil.

The blades or teeth consist of hardened-steel plates, preferably bent and slightly twisted and drawn down to a feather-edge, polished, and curved or pointed at the ends. These teeth or blades are slotted at the upper ends, whereby they are adjustably set edgewise in proper position on the branches of the forked arms. On the outer branches the blades are placed, by preference, on the inner side, and on the shorter branches one is secured on one side and the other on the other side. This arrangement may of course be varied; but its object is to so locate the teeth that each will take its own path.

The guard-plates or shields 16 are secured to the knuckles 10; hence their distance from each other is regulated by the adjustment of the knuckles. The object of these shields is to form a protection for the corn, particularly the tender shoots, which are otherwise liable to become injured or covered with clods of earth stirred by the teeth or blades.

The shields may be raised or lowered, as well as placed nearer together or farther apart, and it is designed that they should just ride along the surface of the soil without entering it.

The whiffletrees or other draft-connections are hitched to the hooks 17 on the pendent arms 12. The draft being at this point has a tendency to force the teeth or knives into the soil; but this effect is counteracted by the mechanism now to be described.

Toothed segments 18 are located on the beams 1 opposite each other. The toothed portions of these segments extend up vertically and the lower portion at right angles thereto. Said horizontal portions are provided with transverse slots 19, by which the segments are shifted sidewise. Bolts 20 extend through these slots and through the beams and capplate 21. By loosening the nuts on these bolts the segments are slid in or out, accordingly as the teeth or blades are shifted on the cross-bar 7. The latch-levers 22 are pivoted to these segments, and to the lower ends of these levers links 23 extend down to the forked arms, in order that they may be raised or lowered by the levers. Thus it is seen that nearly all the parts of the cultivator may be changed and adjusted. The beams, the cross-bar, the wheels, and the shields may all of them be shifted to suit the rows and the depth the soil is to be stirred.

As constructed, the cultivator is intended for two horses. The horses straddle the rows in the usual manner, the shields running along on each side of the corn and the teeth stirring the soil and tending to throw it toward the corn, but the guards or shields preventing it from covering the corn. After the teeth are placed in position to suit the rows the driver only has to retain his seat and operate the levers to regulate the depth of cut.

It is evident that slight changes might be resorted to in the form and arrangement of the several parts described without departing from the spirit and scope of my invention; hence I do not wish to limit myself to the particular construction herein set forth; but, Having fully described my invention, what I claim as new, and desire to secure by Letters Patent, is—

1. In a cultivator, the combination, with beams and a cross-bar secured thereto, of teeth or blade supports adjustable laterally toward and away from the beams, and levers also adjustable toward and away from the beams for elevating the teeth or blade supports.

2. In a cultivator, the combination, with beams, a cross-bar adjustably secured thereto, and teeth-supports adjustably connected to said cross-bar, of plates adjustably secured to the beams, and levers pivoted to said plates and connected to the teeth-supports, substantially as set forth.

3. The combination, with a beam, of a cross-bar thereon, teeth-carrying arms and guards adjustably connected to the cross-bar, and levers for raising and lowering the teeth-carrying arms, substantially as set forth.

4. The combination, with the beams and a cross-bar secured thereto, of knuckles adjustably secured to the latter, pendent arms pivoted to the knuckles, forked arms connected with the pendent arms, teeth adjustably secured to the forked arms, and means for raising and lowering the arms, substantially as set forth.

5. The combination, with beams and a cross-bar secured thereto, of knuckles adjustably secured to the cross-bar, pendent arms pivoted to the knuckles, means for applying the draft thereto, and shields extending from the knuckles and tooth-carrying arms from the pendent arms, substantially as set forth.

6. The combination, with a pair of beams and cross-bar, the latter having elongated slots therein, of knuckles adjustably secured in the slots, arms pivoted to the knuckles, forked arms connected with the pivoted arms, teeth adjustably secured to the branches of the forked arms, segments adapted to be shifted on the beams, and latch-levers pivoted on the segments and connected with the forked arms, substantially as set forth.

In testimony whereof I have signed this specification in the presence of two subscribing witnesses.

JOHN CLARE.

Witnesses:
O. G. SEXTON,
R. CLARE.